July 17, 1962 H. A. CARTWRIGHT 3,044,661
GOVERNOR-CONTROLLED DISPENSING APPARATUS
Filed Feb. 29, 1960 3 Sheets-Sheet 1
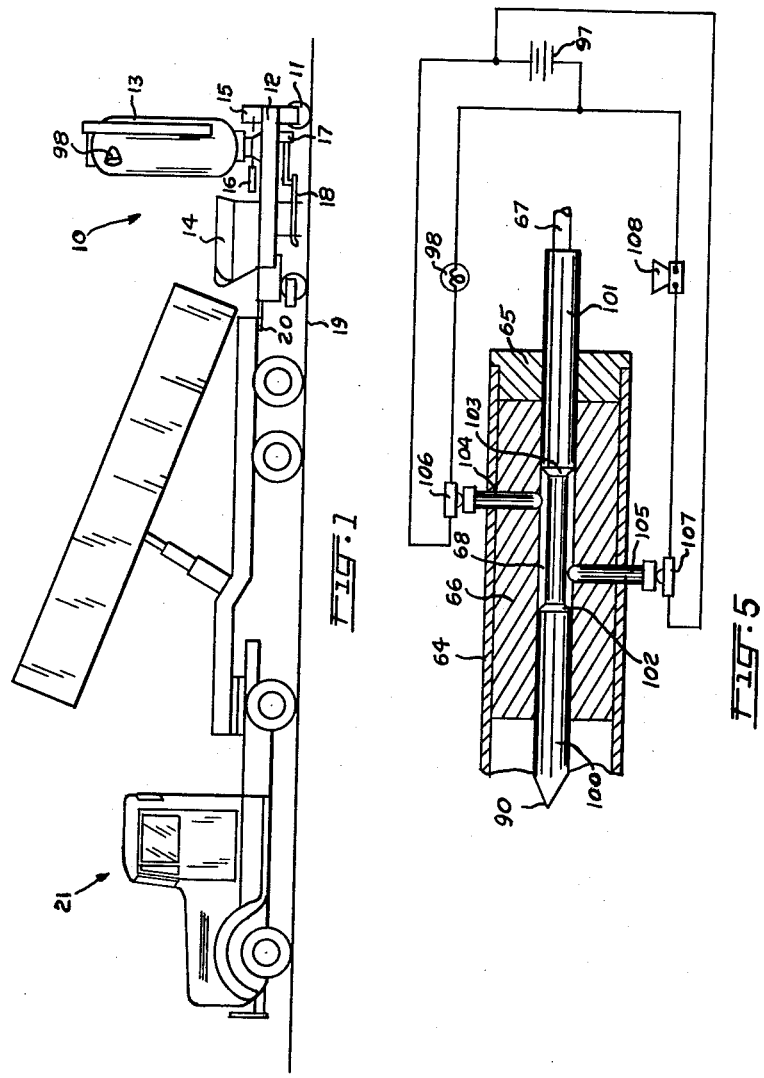
INVENTOR
HORACE A. CARTWRIGHT
BY  W. E. Sherwood
ATTORNEY

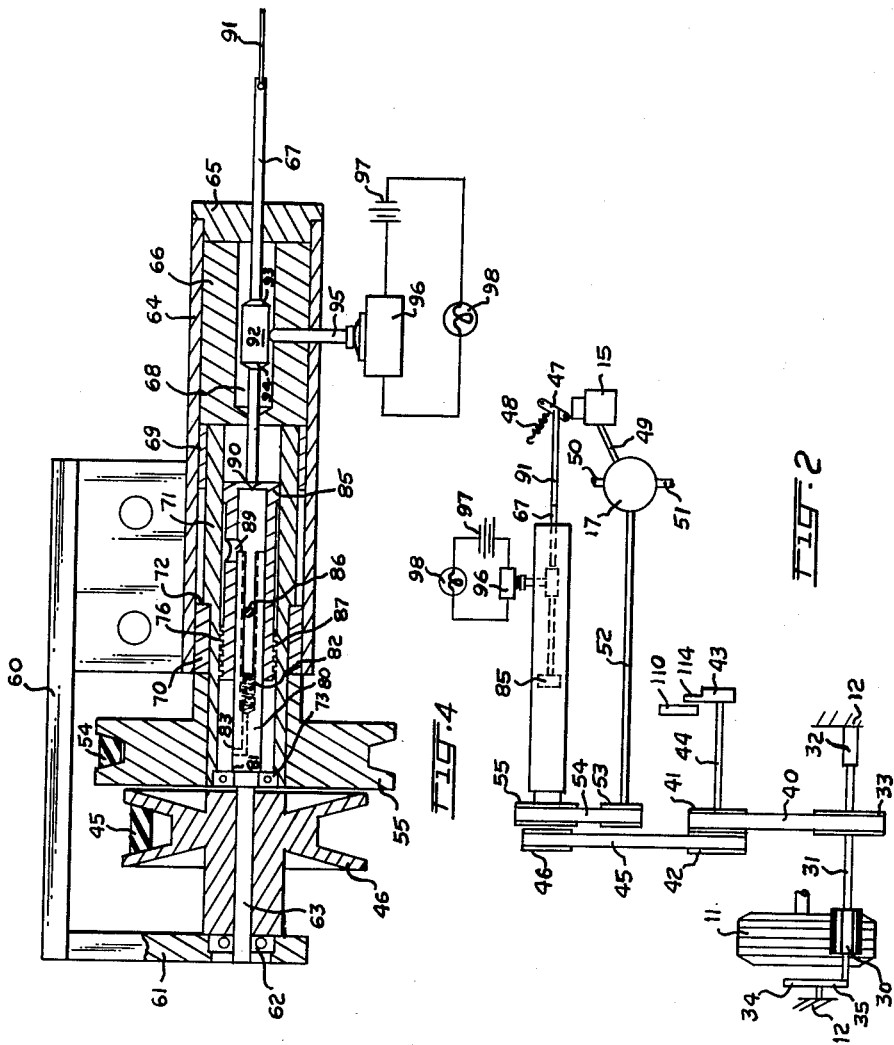

July 17, 1962
H. A. CARTWRIGHT
3,044,661
GOVERNOR-CONTROLLED DISPENSING APPARATUS
Filed Feb. 29, 1960
3 Sheets-Sheet 3
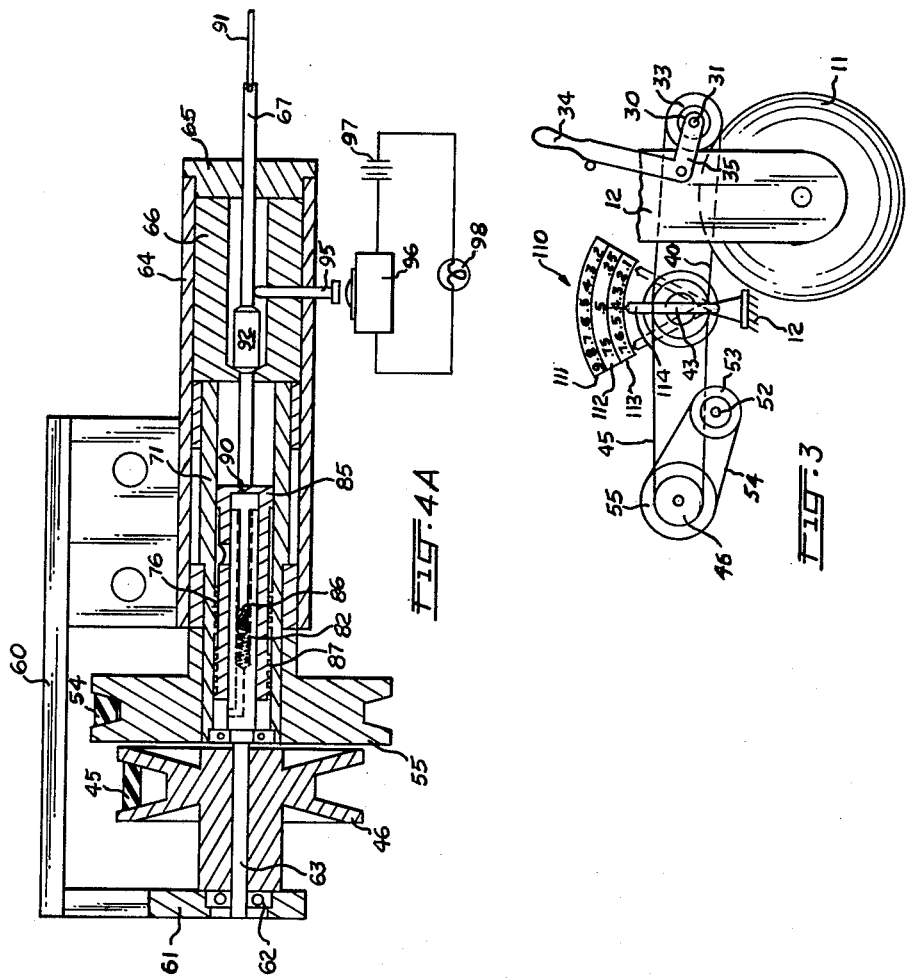
INVENTOR
HORACE A. CARTWRIGHT
BY W.E. Sherwood
ATTORNEY

United States Patent Office 3,044,661
Patented July 17, 1962

3,044,661
GOVERNOR-CONTROLLED DISPENSING
APPARATUS
Horace A. Cartwright, Lexington, Ky.
(4106 S. Rockford St., Tulsa, Okla.)
Filed Feb. 29, 1960, Ser. No. 11,770
3 Claims. (Cl. 222—25)

This invention relates to an improved apparatus for dispensing material upon a generally flat surface at a uniform quantity per unit area of that surface. More particularly, it relates to a governor-controlled apparatus for applying bituminous material, such as asphalt, oil or the like, upon a surface such as a street or highway.

In the employment of equipment of this type, many practical problems are encountered and for the solution of which numerous innovations have been proposed. Many of these innovations, however, while superficially appearing to be practical have, in fact, proven to be impractical when subjected to actual field conditions. For example, large quantities of the bituminous material and of the aggregate material when such is to be dispensed simultaneously with the former, are required. The resupply of such materials must be closely coordinated with the actual dispensing operations when efficient usage of equipment is dictated; numerous separate vehicles and drivers are needed for such resupply; the linear advance of the dispensing apparatus must be maintained in a prescribed relation to the material dispensing rate in order to achieve a uniform per unit area coating of the surface and the drivers of the various supply trucks often find it difficult to determine by presently available means whether their trucks are moving at the proper speed; and the equipment employed must be sturdy enough to resist rough handling and the generally difficult environmental factors found in road construction. It is these and similar problems found in the use of dispensing apparatus of this type which the present invention is intended to overcome.

An object of the invention is to provide an improved governor-controlled dispensing apparatus.

Another object is to provide an improved governor-controlled dispensing apparatus mounted upon a towed vehicle and having a signalling means physically separate from the towing vehicle.

Another object is to provide an improved governor-controlled dispensing apparatus whose dispensing rate, per unit area of surface to be covered, may be readily adjusted.

A further object is to provide an improved governor-controlled dispensing apparatus requiring no special ground-engaging wheels, tachometers, bitumeters, or control connections to the towing vehicle.

Other objects and advantages will become more apparent as the description proceeds and when considered in conjunction with the accompanying drawings in which:

FIG. 1 is a schematic view of a coupled towing vehicle and a vehicle towed thereby and on which the dispensing apparatus of the invention is mounted.

FIG. 2 is a diagrammatic view of one arrangement for driving the dispensing apparatus in accordance with the invention.

FIG. 3 is a diagrammatic view illustrating one arrangement for adjusting the dispensing rate of the apparatus.

FIG. 4 is a longitudinal section view through the governor, with parts shown in elevation, and with the governor signalling a normal operation condition of dispensing through one form of signalling means.

FIG. 4A is a view similar to FIG. 4 and with the governor signalling an idling operating condition, and FIG. 5 is a partial view of the governor showing a second form of signalling means.

The present invention is an improvement upon governor-controlled dispensing apparatus of the general type shown in Cartwright Patent No. 2,159,319 and preferably, but not necessarily, is intended to be employed with apparatus as more fully described and shown in the co-pending application of Horace A. Cartwright, Serial No. 858,913, filed December 11, 1959.

Referring now to FIG. 1, an improved dispensing vehicular apparatus generally shown at 10 and preferably of the type disclosed in the aforementioned application, may be supported upon a plurality of ground-engaging wheels, one of which is seen at 11. These wheels support a chassis having a frame 12 on which is mounted a large container 13 for a supply of liquid material to be dispensed, and a large hopper 14 for receiving a supply of aggregate to be dispensed. Also mounted upon the chassis is a suitable prime mover 15, controlled by a governor 16 and driving a pump 17 which serves to withdraw liquid from the container and to move it into a suitable distributing means 18. This distributing means which may be of the type shown in the co-pending application of Horace A. Cartwright, Serial No. 824,526, filed July 2, 1959, is adapted to spray material uniformly and transversely of the surface 19 along which the vehicular apparatus 10 moves.

The vehicular apparatus 10 is towed through a suitable coupling means 20 attachable to the rear of a truck indicated generally at 21 and which truck also serves to supply aggregate into hopper 14 while travelling. As will now be apparent to those skilled in the art, the driver of truck 21 must carefully control the forward speed of his truck in order to relate the speed of linear advance of the coupled vehicles to the rate at which the liquid and aggregate are being dispensed, if the surface 19 is to be covered with materials at a uniform per unit area quantity. By means of the apparatus shown in the aforementioned application, Serial No. 858,913, and forming no part of the present invention, aggregate is dispensed from hopper 14 at a rate commensurate with the rate of linear advance of the coupled vehicles. However, the rate of dispensing of the liquid asphalt, oil, or the like and the signalling to the driver as to how the speed of his truck is related to that dispensing, presents a different problem.

Referring now to FIGS. 2 and 3, one solution of this problem in accordance with the invention may be achieved by employment of a governor-control having an output element which controls the speed of the pump and having first and second input control elements which are controlled respectively by the speed of linear advance of the coupled vehicles and by the speed of the pump. In addition, the movement of the output control element in combination with a signalling mechanism serves to instruct the driver of the truck as to whether he is moving the apparatus at a proper, or at an improper, speed.

A small diameter pilot wheel 30 rigidly mounted upon a shaft 31 extending transversely of the frame 12 and supported at one end in a conventional self-aligning bearing 32 mounted on that frame, is arranged for selective driven contact with the ground-engaging periphery of wheel 11. Intermediate the ends of shaft 31 a constant diameter pulley 33 is rigidly attached to the shaft and by means of a conventional bell-crank at the other end of the shaft and pivotally mounted on frame 12, the pilot wheel may be selectively brought into and removed from contact with, the ground-engaging wheel 11. A handle 34 having any suitable latching means for securely holding the lower arm 35 of the bell crank in a selected position and in turn positioning the pilot wheel with respect to wheel 11, may be employed and will be operated by an attendant of the apparatus 10.

As best shown in FIG. 2, a belt 40 engaging at all times with pulley 33 serves to drive a driven sheave 41 of a conventional variable-drive means having a driving sheave 42 and a diameter-ratio adjusting handle 43 on an adjusting shaft 44. This variable-drive means may be of the well known Reeves Drive type or Toledo Drive type, it being understood that movement of handle 43 serves to change the ratio of the effective diameters of the respective sheaves, the diameter of one being increased as the diameter of the other is diminished. From the driving sheave 42 a belt 45 engages at all times a pulley 46 serving as part of the first input control element of the differential governor later to be described. It will be understood that while the use of belts are preferred in the drive shown in FIG. 2, equivalent means such as chains, ropes, or the like may be employed without departing from the invention.

As further shown in FIG. 2, the prime mover 15 may comprise a small internal combustion engine having a starter and battery and including a conventional throttle arm 47 biased toward idling position by a spring 48. This engine incorporates a clutch reduction gear with a chain coupling 49 driving pump 17, and the engine has sufficient capacity not only to drive that pump but also to drive an air compressor as disclosed in the afore-mentioned application, Serial No. 858,913. By means of conduits 50 and 51 leading into and from the pump, the flow of liquid from tank 13 to the distributor 18 and with the features of recirculation and with variable effective lengths of distribution, as taught in application S.N. 824,526, may be accomplished. The shaft 52 of pump 17 carries adjacent one end a pulley 53 rigidly attached thereto. A belt 54 engaged at all times with this pulley also engages at all times with a pulley 55 serving as part of the second input control element of the differential governor now to be described. As will be apparent from the foregoing, all of the driving elements are simple and mechanically strong and are less likely to malfunction than are the flexible shafts, tachometers, bitumeters and the like, as heretofore proposed for equipment of this type.

Referring now to FIGS. 4 and 4A an improved differential governor of the type shown in Patent No. 2,159,319 is employed and may comprise a frame 60 having means for securely mounting the assembly upon the chassis frame 12 relatively near the throttle of engine 15. A bracket portion 61 at one end of the governor frame provides a recess for a friction-reducing bearing 62 rotatably mounting a shaft 63 to which pulley 46 is rigidly affixed as by a set screw (not shown). At the other end of the governor frame a hollow cylindrical housing 64 whose axis coincides with the axis of shaft 63 is rigidly attached and is closed at the end by a centrally apertured plate 65. A guide spacer 66 having an aperture at each end for slidably receiving the governor output control element 67 is disposed inboard of the plate 65 and contains an enlarged recess 68 serving a purpose later to become apparent.

Inwardly of the spacer, a pair of bushings 69 and 70, spaced from each other, are mounted within the hollow housing. Rotatably mounted within these bushings is a hollow sleeve 71 having a shoulder 72 thereon and with the end of the sleeve abutting against the end of the spacer 66. Shoulder 72 in turn engages against one end of bushing 70 and thus, although the sleeve is free to rotate, it is confined against axial movement. At its outermost end the sleeve includes an inner recess mounting a second friction-reducing bearing 73 serving to mount the shaft 63 and also has rigidly affixed to the outer surface of that sleeve the pulley 55. Finally, the sleeve is interiorly threaded as at 76 for a short distance between pin 86 and the end of the sleeve carrying the pulley 55.

The shaft 63 includes an enlarged portion 80 having a shoulder 81 engaging against the inner end of the bearing 73 and with the forwardly projecting portion of the shaft being bifurcated. At the base of the bifurcated shaft portion, a recess is provided for loosely housing a compressible spring 82 and a vent opening 83 may connect this recess with the side of that shaft inboard of the shoulder 81. The hubs of pulleys 46 and 55 together with the respective shoulders 81 and 72 and the spacer 66 all cooperate to prevent endwise play of the above-described parts, while still permitting free rotation of shaft 63 and of sleeve 71.

Surrounding the bifurcated end of shaft portion 80 is a hollow piston 85 having its open end facing toward the bearing 81 and its closed end facing toward spacer 66. The inner wall of this piston has a sliding fit with the outer surface of the enlarged part 80 of shaft 63 and a pin 86 rigidly mounted in the piston walls and extending transversely of the piston is at all times in engagement with the two legs of the bifurcated portion of that shaft. On its outer surface at the end facing toward bearing 81 and beyond pin 86, the piston is threaded as at 87 for engagement with the threaded portion 76 of the rotatable sleeve. It will be understood that the length of the threaded portion 87 and the travel spaces of the piston in each direction of its movement are such that the piston may become entirely detached from engagement with the sleeve, as will later be described. A vent hole 89 also is provided in the wall of the piston to permit oil circulation when the governor is internally lubricated.

Journalled within the apertures in spacer 66 and wall 65 is an output control element 67 comprising a small rod having its inner end 90 in loose contact with the closed end of piston 85. A suitable means such as a rod or stiff wire 91 is attached to element 67 and connects with the throttle lever 47 of the engine. Movement of piston 85 to the right in FIG. 4 moves the rod 91 against the action of the throttle spring 48 to open the throttle and to increase the speed of the engine, whereas as piston 85 moves to the left, that spring moves rod 91 and element 67 to the left keeping the end 90 of the element in contact with the closed end of the piston. Additional spring means (not shown) may be employed to assist in this action when desired.

As a feature of the invention a signalling arrangement is preferably employed in combination with the above described apparatus. In the modification shown in FIGS. 4 and 4A, output control element 67 may include an enlarged portion 92 housed within recess 68 and having bevelled sections 93 and 94 at its ends, the enlarged portion being arranged to move a projecting plunger 95 into switch closing position when the piston occupies one predetermined position and to permit that plunger to move to switch-opening position when the piston occupies another predetermined position. For example, plunger 95 may press upon a spring biased microswitch 96 in a circuit including the battery 97 of the prime mover 15 and a large lamp 98 focused in the direction of the cab of truck 21. This apparatus is mounted in its entirety upon the towed vehicle 10 and may be employed in the signalling of normal and abnormal operating conditions as later to be described.

In the modification shown in FIG. 5 the output control element 67 may include two enlarged portions 100 and 101 spaced from each other and movable through the recess 68, the portion 100 having a bevelled section 102 and the portion 101 having a bevelled section 103. In this arrangement two plungers 104 and 105 spaced from each other project into the path of the output control element for actuation thereby. Plunger 104 may press upon a spring biased microswitch 106 in a circuit including battery 97 and a large lamp 98 focused in the direction of the cab of truck 21. Plunger 105 may press upon a spring biased microswitch 107 in a circuit including battery 97 and an audible signalling means such as a siren or horn 108 focused in the direction of the cab of that truck.

Referring now to FIG. 3, an important feature of the invention is shown wherein the employment of the conventional variable-speed drive is related to width of road to be covered by the dispensed materials. The effective dispensing width of distributor 18 may in accordance with application S.N. 824,526 be adjusted to give sprayed widths for example of 6 feet or 8 feet, or 10 feet. Since the operation of the governor-control is such that the quantity of pumped material being dispensed per unit area of surface is dependent upon the speed of that pump, it follows that when the total surface is increased or diminished by use of an enlarged or diminished width of distributor means, an adjustment in that pump speed is required. Accordingly, a simple fan-shaped chart 110 having calibrated bands 111, 112, and 113 corresponding to three different widths of distributor spray, is rigidly mounted upon chassis frame 12. A pointer 114 attached to adjusting handle 43 of the variable-speed drive means cooperates with the chart to indicate the setting required for maintenance of the prescribed quantity of liquid material to be dispensed per unit area of surface. The operation of handle 43, as in the case of the handle 34, is conducted by an attendant of the towed vehicle who may also conduct the coupling and uncoupling of the towing truck to that vehicle.

With the foregoing in mind the operation of the apparatus may be carried out as follows. With the towed vehicle prepared for dispensing in accordance with the afore-mentioned application, the operator adjusts handle 34 to bring the pilot wheel 30 into contact with the ground-engaging wheel 11 and the truck driver accelerates the coupled vehicles forwardly toward the estimated proper speed. At this time the pointer 114 is set at the position corresponding to the width of surface being covered and to the quantity per unit area of surface desired. Prime mover 15 initially is driving pump 17 at an idling recirculating rate of speed and through belt 54 the second input control element including pulley 55 and sleeve 71 are rotating with the parts positioned as seen in FIG. 4A. The light 98 accordingly is not illuminated and the truck driver is aware that he has not yet reached the proper speed. However, since the towed apparatus 10 has not yet reached the initial dispensing line on the surface 19, no dispensing is occurring.

Movement of wheel 11 drives pilot wheel 30 and the first input control element including pulley 46, shaft 63 and the bifurcated end of that shaft begins to rotate. As this occurs, the bifurcated end of the shaft engages pin 86 and begins to turn the piston 85. This turning of piston 85 coupled with the action of compression spring 82 moves the piston to the right of FIG. 4A to engage the threaded portion 87 of the piston with the threaded portion 76 of the sleeve and to begin the screwing of that piston into coupled engagement with that sleeve. As piston 85 continues to move to the right due to increasing speed of ground wheel 11, it pushes upon output control element 67 and the throttle of the prime mover is opened to increase the pump speed. This action continues until the governor element reaches a point generally represented in FIG. 4 at which time the towed vehicle has reached the initial dispensing line on the surface and the air operated apparatus of the structure shown in the afore-mentioned apparatus has functioned to begin the spraying action. The differential governor at this time occupies a setting which is dependent jointly upon the speed of the pump and upon the rate of linear advance of wheel 11. As will now be evident, movement of the output control element now brings into play the automatic signalling means in the combination and a strong light, such as a green light, is now directed toward the cab of the truck advising the driver to hold the present speed of his truck. The length of the enlarged portion 92 of the element 67 can be varied as desired depending upon the tolerances permitted in the per unit area quantity being dispensed.

Should the speed of the truck be increased after this time, the piston 85 will continue to move to the right and its threads 87 will then move out of engagement with the threads 76 of the sleeve, since a practical limitation is always present as to how fast pump 17 can be driven. When this occurs, the end of plunger 95 drops down the bevelled surface 94 and the light 98 is extinguished, warning the driver that he is moving too fast. Conversely, if the truck speed slows too much, the piston 85 backs away to the left and the plunger 95 drops down the bevelled surface 93 again warning the driver that he is moving too slow.

When the allotted amount of surface has been covered, the dispensing is interrupted and the truck is brought to a halt. The piston 85 immediately moves to the position shown in FIG. 4A compressing spring 82 and with its threaded section 87 out of engagement with the threaded section 76 of the still rotating sleeve. Meanwhile, the pump speed has been reduced to the idling recirculating speed. The attendant then operates lever 34 to remove the pilot wheel from contact with the ground wheel 11 and the truck driver moves the towed vehicle 10 backward upon the coated surface 19 a prescribed distance whereupon the truck 21 is uncoupled. At this time, resupply of liquid into container 13 may take place while awaiting the coupling of another loaded truck to the vehicle 10.

In the modification shown in FIG. 5, positive signals of different character are given to the truck driver depending upon whether he is driving his truck too fast or too slow. When operating at the proper speed, no positive signal is issued but when driving too slow the enlarged portion 101 of the output control element actuates plunger 104 to illuminate light 98 which conveniently may be a red light. Conversely, if driving too fast, the enlarged portion 100 of that output control element actuates plunger 105 to sound a loud horn 108. In each of the signalling versions no physical connections to the truck 21 is required thus permitting use of a wide variety of trucks and without the expense of specially equipped trucks or the training of truck drivers to read tachometers, bitumeters or the like.

Among the several advantages of the present invention will be found the diminution of the likelihood of cumulative errors in dispensing which has characterized many types of such equipment heretofore employed. No delicate parts of the drive mechanism for the governor are required; the use of a pulley mounted directly upon the first input control element shaft between two friction-reducing bearings; the incorporation of a simple and proven variable-speed drive means in the drive to that first input control element; and the elimination of tachometers or bitumeters with the possibility of error both therein and in the reading of the same, all contribute to reduction of such error.

While I have thus described and illustrated certain specific embodiments of my invention, it will be apparent that numerous changes and modications may be made therein and it is intended to cover by the appended claims all such changes and modifications which fall within the true spirit and scope of the invention.

What I claim as new and desire to secure by Letters Patent of the United States is:

1. In an apparatus for dispensing material at a uniform per unit area quantity upon a surface, a towed vehicle having a supporting wheel engaging said surface, a supply of material upon said vehicle, means for distributing said material upon and transversely of said surface, a pump for drawing material from said supply and for moving said material to said distributing means at a rate proportional to the speed of said pump, a prime mover for driving said pump, rotatable means in selectively removable contact with said wheel and driven thereby at a rate proportional to the speed of linear advance of said wheel upon said surface, means for moving said wheel upon said surface, means for moving said rotatable means into and from contact with said wheel, a differential governor having an output control element extending to said prime mover for varying the speed of said prime mover in dependence upon the setting of said governor, an adjustable variable speed drive means actuated by said rotatable means and operable to establish the setting of said governor, means actuated by said pump and operable to establish the setting of said governor, said output control element of said governor including a signal operating means movable between a first position at which the speed of linear advance of said wheel corresponds to the speed of said pump necessary to dispense material at said uniform quantity and a second position at which the speed of linear advance of said wheel fails to correspond to the speed of said pump necessary to dispense material at said uniform quantity, and a signalling means mounted upon said towed vehicle and adapted to provide a signal for the driver of a companion towing vehicle, said signalling means being actuated by said signal operating means of said output control element whereby a signal may be effected depending upon the position occupied by said output control element.

2. Apparatus as defined in claim 1 wherein said signalling means comprises a light adapted to be actuated when said control element occupies said first position.

3. Apparatus as defined in claim 1 wherein said signalling means comprises a light adapted to be actuated when said control element occupies said second position.

References Cited in the file of this patent
UNITED STATES PATENTS

| | | |
|---|---|---|
| 2,031,262 | Hill | Feb. 18, 1936 |
| 2,159,319 | Cartwright | May 23, 1939 |
| 2,516,173 | Ballew | July 25, 1950 |
| 2,607,834 | Connors | Aug. 19, 1952 |
| 2,833,542 | Martin | May 6, 1958 |